United States Patent
Hattemer et al.

(10) Patent No.: US 7,977,445 B2
(45) Date of Patent: Jul. 12, 2011

(54) STORAGE-STABLE AQUEOUS EMULSIONS OF α-SILYL TERMINATED POLYMERS

(75) Inventors: Erik Hattemer, Duesseldorf (DE); Lothar Unger, Oberhausen (DE); Andreas Ferencz, Duesseldorf (DE); Thomas Bachon, Duesseldorf (DE); Daniela Braun, Shanghai (CN); Tamara Schmidt, Oberhausen (DE); Werner Juettner, Duesseldorf (DE)

(73) Assignee: Henkel AG & Co. KGaA, Dusseldorf (DE)

( * ) Notice: Subject to any disclaimer, the term of this patent is extended or adjusted under 35 U.S.C. 154(b) by 739 days.

(21) Appl. No.: 11/938,867

(22) Filed: Nov. 13, 2007

(65) Prior Publication Data

US 2008/0125541 A1    May 29, 2008

Related U.S. Application Data

(63) Continuation of application No. PCT/EP2006/004372, filed on May 10, 2006.

(30) Foreign Application Priority Data

May 13, 2005   (DE) .......................... 10 2005 023 050

(51) Int. Cl.
    *C08G 83/00*  (2006.01)
    *C08G 65/00*  (2006.01)
(52) U.S. Cl. ............ 528/28; 528/38; 528/425; 528/100; 528/104; 528/105; 528/106; 528/393; 528/431; 528/446; 528/464
(58) Field of Classification Search .................. None
    See application file for complete search history.

(56) References Cited

U.S. PATENT DOCUMENTS

| | | | | |
|---|---|---|---|---|
| 5,041,494 | A | * | 8/1991 | Franke et al. |
| 5,118,752 | A | * | 6/1992 | Chang et al. .............. 524/521 |
| 5,919,860 | A | * | 7/1999 | Roesler et al. |
| 7,332,541 | B2 | * | 2/2008 | Schindler et al. .............. 524/588 |
| 2006/0111505 | A1 | * | 5/2006 | Schindler et al. | |

FOREIGN PATENT DOCUMENTS

| | | | |
|---|---|---|---|
| DE | 19958525 A1 | * | 6/2000 |
| DE | 10237271 | * | 3/2004 |
| EP | 0549626 | * | 4/1992 |
| WO | WO91/08244 | * | 6/1991 |
| WO | WO93/23490 | * | 11/1993 |
| WO | WO00/35981 | * | 6/2000 |
| WO | WO02/068501 | * | 9/2002 |
| WO | WO2004/022618 | * | 3/2004 |

OTHER PUBLICATIONS

Surfactant Science and Technology, Second Edition authored by Drew Myers and published by VCH Publishers Inc. (1992).*
Roempp Chemie Lexikon, Georg Thieme Verlag Stuttgart, vol. 3, 1995, pp. 1812-1813.
Kirk-Othmer, Encyclopedia of Chemical Technologies (3), 8, pp. 910-918.
JP2002138251 Abstract.

* cited by examiner

*Primary Examiner* — Marc S Zimmer
(74) *Attorney, Agent, or Firm* — James E. Piotrowski; Steven C. Bauman

(57) ABSTRACT

Aqueous, storage-stable emulsions of α-silyl terminated polymers are useful as adhesives, sealing compounds and coating materials. The α-silyl terminated polymers correspond to the general formula (I):

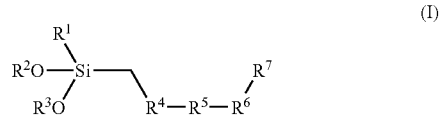

(I)

in which $R^1$ is a linear or branched alkyl or alkoxy group containing 1 to 4 carbon atoms, $R^2$ and $R^3$ independently of one another are linear or branched alkyl groups containing 1 to 4 carbon atoms, $R^4$ and $R^6$ independently of one another are divalent organic connecting groups, $R^5$ is a hydrophobic divalent polymer group; and $R^7$ is a $CH_2SiR^1(OR^2)(OR^3)$ group, in which $R^1$, $R^2$ and $R^3$ have the above meaning or $R^7$ stands for a group that lends the polymer of the general formula (I) the property of self-emulsification in water by forming an oil in water emulsion.

21 Claims, No Drawings

STORAGE-STABLE AQUEOUS EMULSIONS OF α-SILYL TERMINATED POLYMERS

CROSS-REFERENCE TO RELATED APPLICATIONS

This application is a continuation under 35 USC Sections 365(c) and 120 of International Application No. PCT/EP2006/004372, filed 10 May 2006 and published 23 Nov. 2006 as WO 2006/122684, which claims priority from German Application No. 102005023050.4, filed 13 May 2005, each of which is incorporated herein by reference in its entirety.

FIELD OF THE INVENTION

The present invention relates to aqueous, storage-stable emulsions of α-silyl terminated polymers, their production and use as adhesives, sealing compounds and coating materials.

DISCUSSION OF THE RELATED ART

Silyl-terminated, moisture curable polymer compounds are increasingly used as coating materials, sealing compounds and adhesives in the construction industry and in the automobile industry. For such applications, stringent requirements are placed on the elongation- and adhesion capabilities as well as on the curing rate. In addition, such silyl-terminated polymers often possess water repellent properties that lend excellent water stability and heat stability to the sealing compounds, coating materials or adhesives prepared from them.

Alkoxy silane terminated polymers are known from the prior art and are utilized as soft elastic sealing compounds, coating materials and adhesives.

Thus, alkoxy silane terminated, moisture curable one-component polyurethanes are described in EP-B 0 549 626, which find use, for example, as caulking compounds. The disclosed compounds exhibit a rapid skin formation and rapidly become tack-free, even after prolonged storage. However, the disadvantage of the described compounds is that they have to be stored in the absence of moisture and over a long period of storage there exists the danger of irreversible changes in properties.

In the past, in order to overcome this disadvantage, experiments were carried out to manufacture emulsions or emulsions of silyl terminated polymers.

Aqueous polyurethane dispersions for coatings that comprise alkoxy silanes are described in U.S. Pat. No. 5,919,860 and U.S. Pat. No. 5,041,494. Here, the polyurethanes are modified with ionic groups.

However, the described emulsions mostly possess a low solids content. If such emulsions are used for adhesively bonding absorbent materials, then the high water content leads to a high loading of the substrate with water. For example, in paper adhesion, this can lead to unwanted changes in shape of the substrate.

WO 91/08244 relates, for example, to stone protection agents that comprise alkoxy silyl terminated polyurethanes. However, the polymer contents of the described emulsions are very low, and lie between 5 and 30 wt. %. The described emulsions are neither useful as surface coating agents in the context of manufacturing mechanically resilient coatings nor as sealants or adhesives.

A problem associated with the majority of emulsions of silyl terminated polymers known from the prior art is that only low solids contents can be produced. Such low solids contents are however, beside the above-described disadvantage of the impact of water on the substrate, associated with a series of disadvantages such as, for example, very slow adhesion of non-absorbent substrates.

One possibility for overcoming these disadvantages is published in WO 00/35981, which provides emulsions of silyl terminated polymers with a high solids content.

BRIEF SUMMARY OF THE INVENTION

However, as in the prior art up to now only dispersions or emulsions of the comparatively slow reacting γ-silyl terminated polymers are disclosed, it was an object of the present invention to provide aqueous emulsions of the significantly higher reactive α-silyl terminated polymers, which in addition to a high solids content exhibit a storage stability that has not been achieved up to now. The term "solids content" is understood in the following as the weight percent fraction of the emulsion components discounting the weight fraction of water in the emulsion, based on the total weight of the emulsion. This object is achieved by the provision of aqueous, storage stable emulsions of one α-silyl terminated polymer or a plurality of α-silyl terminated polymers of the general formula (I):

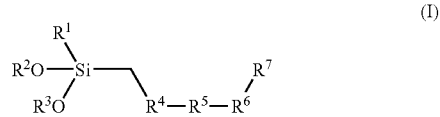

in which $R^1$ is a linear or branched alkyl or alkoxy group containing 1 to 4 carbon atoms, $R^2$ and $R^3$ independently of one another are linear or branched alkyl groups containing 1 to 4 carbon atoms, $R^4$ and $R^6$ independently of one another are divalent organic connecting groups, $R^5$ is a hydrophobic divalent polymer group; and $R^7$ is a $CH_2SiR^1(OR^2)(OR^3)$ group, in which $R^1$, $R^2$ and $R^3$ have the above meaning or $R^7$ stands for a group that lends the polymer of the general formula (I) the property of self-emulsification in water by forming an oil in water emulsion; and wherein the emulsion has a pH of 2 to 11 and a solids content of 40 to 95 wt. % based on the total weight of the emulsion, and the emulsion comprises one anionic and/or non-ionic emulsifier or a plurality of anionic and/or non-ionic emulsifiers that are able to form an oil in water emulsion; and wherein, for the case where $R^7$ stands for a group that lends the polymer of the general formula (I) the property of self-emulsification in water to yield an oil in water emulsion, at least a part of the emulsifier or the emulsifiers is replaced by polymers of formula (I).

Such emulsions are available by mixing the aqueous fraction of the emulsion with a mixture of the emulsifier(s) and the polymer(s) of the general formula (I).

DETAILED DESCRIPTION OF CERTAIN EMBODIMENTS OF THE INVENTION

In the general formula (I), $R^1$ preferably stands for methyl, ethyl, methoxy or ethoxy and $R^2$ and $R^3$ preferably stand, independently of one another, for methyl or ethyl. $R^1$ particularly preferably stands for methyl or methoxy and $R^2$ and $R^3$ for methyl. When an increased reactivity and crosslinkability are desired, then the trimethoxy compounds are preferred.

$R^4$ and $R^6$, independently of one another can represent any divalent connecting groups. The term "divalent", as used throughout the present invention, means that the group in question possesses valences for bonding to the two groups that are directly adjacent to it. For $R^6$ for example, this means that this group possesses a valence for each of the bonds to $R^5$ and $R^7$. In spite of that, however, the group $R^6$ may also be an additionally branched group. This is also the case for the groups $R^4$ and $R^5$.

One of the simplest $R^4$ groups results, for example, when an isocyanate terminated α-silane is directly bonded to a hydroxy terminated polymer. In this case the connecting group $R^4$ is a urethane group. However, indirect connections of the α-silane with the polymer backbone of the polymer(s) of formula (I) can also be considered. Thus, the group $R^4$ can also be formed from a connecting molecule that is capable of both a covalent reaction with a functional group of the α-silane and also a covalent reaction with the polymer backbone. Thus, for example, diisocyanates can react with both an amino silane to form a urea group and with a hydroxy terminated polymer to form a urethane group, whereby a divalent connecting group $R^4$ is formed that comprises urea and urethane groups. Similarly, the statement for the connection of the α-silane is also valid for the group $R^7$.

In the present invention, connecting groups $R^4$ and $R^6$ that comprise urea- and/or urethane groups, are preferred. However, the connecting groups $R^4$ and $R^6$ can comprise any other functional groups or be formed from them. Thus, for example, ester groups or amide groups can be involved in the connection of the silane and/or the group $R^7$ to the polymer backbone $R^5$.

The groups $R^4$ and $R^6$ particularly preferably stand for a group —$NR^9$—(CO)—$R^{10}$—, wherein the group $R^{10}$ is bonded to $R^5$, and $R^9$ stands for hydrogen, a linear or branched alkyl group containing 1 to 6 carbon atoms, a cycloalkyl group containing 4 to 6 carbon atoms or an aryl group containing 5 to 10 carbon atoms; and $R^{10}$ stands for a single bond or a group —$NR^{11}$—$R^{12}$—, wherein the group $R^{12}$ is bonded to $R^5$, and $R^{11}$ stands for hydrogen, a linear r branched alkyl group containing 1 to 6 carbon atoms, a cycloalkyl group containing 4 to 6 carbon atoms or an aryl group containing 5 to 10 carbon atoms; and $R^{12}$ stands for a group —$R^{13}$—(NH)$_r$—(CO)— with r=0 or 1, in which $R^{13}$ stands for an alkylaryl group containing 6 to 11 carbon atoms, an aralkyl group containing 6 to 11 carbon atoms, or an aryl group containing 5 to 10 carbon atoms, wherein the CO group is bonded to $R^5$.

$R^4$ and $R^6$ particularly preferably stand independently of one another for a group of formula (II):

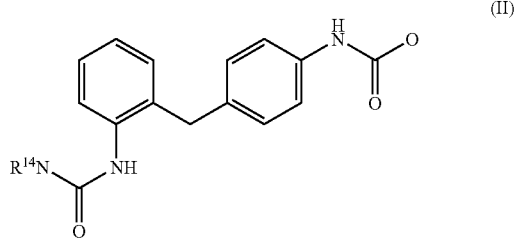

(II)

wherein the linkage to $R^5$ occurs through the urethane group and $R^{14}$ stands for hydrogen, a linear or branched alkyl group containing 1 to 6 carbon atoms, a cycloalkyl group containing 4 to 6 carbon atoms or an aryl group containing 5 to 10 carbon atoms.

The group $R^5$ stands for the divalent group of a hydrophobic polymer. A hydrophobic polymer is understood to mean an essentially water-insoluble polymer. The group $R^5$ stands for the divalent group of a polyalkylene glycol, such as polypropylene glycol, for the divalent group of a polytetrahydrofuran, polyester, polyacrylate, polymethacrylate, polycyanoacrylate, polystyrene, polyamide, polyether polyvinyl acetate, polycaprolactam, polycaprolactone, polybutadiene, polyalkylene such as for example polyethylene, polyvinyl chloride, polyacrylamide, polyacrylonitrile, polyethylene terephthalate, polycarbonate, polysulfide, polyether ketone, epoxy resin, phenol formaldehyde resin, polyurethane, polysiloxane or a copolymer of monomers of the cited polymers, such as for example for the divalent group of an ethylene/α-olefin copolymer, styrene/butadiene copolymer, styrene/acrylonitrile copolymer, and/or ethylene/vinyl acetate copolymer. Copolymers are understood to mean copolymers of any structural type of at least 2 different monomers, on which are based the above polymers, such as block copolymers, statistical copolymers or gradient copolymers. Different polymer fragments, such as the individual blocks in block copolymers can be linked in this way through divalent organic connecting groups. The groups defined above as $R^4$ and $R^6$ are inter alia suitable as divalent organic connecting groups. Minor amounts of hydrophilic monomers, oligomers or polymers can also be polymerized into the group $R^5$, in so far as the overall hydrophobic property of the polymer based on $R^5$ is retained.

The molecular weight range of the underlying polymer can vary widely and is essentially unlimited. It mainly depends on the processability of the polymer. The processing of highly viscous polymers can, for example also be made accessible by the addition of suitable solvents.

The production of these types of polymers is commonly used by the person skilled in the art and is described, for example in DE 199 58 525 A1. These polymers are usually linked with the silyl group or the group $R^7$ through the connecting groups $R^4$ and $R^6$ using reactive α,ω-end groups of the polymer. When, for example, the polymer has OH groups or $NH_2$ groups in the α,ω-position, then it can react, for example, with an NCO, halide, oxirane, acid anhydride or acid halide group of the silane or that of the molecule based on the group $R^7$ or with corresponding groups of the connecting molecules based on the connecting elements $R^4$ and $R^6$.

$R^5$ is preferably a divalent polyalkylene glycol group, particularly a polypropylene glycol group, a polyester group or a polytetrahydrofuran group. The polyester and polytetrahydrofuran groups are particularly preferred if the adhesive bonds produced by the emulsions are also intended to have high tensile shear strengths on non-porous substrates. With respect to long-term stability, the polyalkylene glycol-based polymers of formula (I) are preferred.

The inventive emulsion comprises anionic and/or non-ionic emulsifiers. The emulsifiers used must be suitable for the production of oil in water emulsions. According to Römpp Chemie Lexikon (9$^{th}$ extended and newly compiled edition, Georg Thieme Verlag Stuttgart, vol. 3 (1995), pages 1812-1813), these are essentially those emulsifiers with a hydrophilic-lipophilic balance (HLB value) of 8 to 18. The HLB value is understood to be a measure of the water- or oil-solubility of surfactants. The HLB value of a surfactant mixture or emulsifier mixture can be calculated from the summed values of its components Comprehensive lists of HLB values of commercially available emulsifiers can be found, for example in Fiedler, Lexikon der Hilfsstoffe for Pharmazie, Kosmetik oder angrenzende Gebiete or in Kirk-Othmer (3) 8, 910-918. In the present invention, emulsifiers are preferred with an HLB value of 8 to 15.

Exemplary anionic emulsifiers are alkyl sulfates, particularly those with a chain length of about 8 to about 18 carbon atoms, alkyl and alkaryl ether sulfates containing about 8 to 18 carbon atoms in the hydrophobic group and 1 to about 40 ethylene oxide (EO) or propylene oxide (PO) units, or their mixtures, in the hydrophilic part of the molecule, sulfonates, particularly alkyl sulfonates containing about 8 to 18 carbon atoms, taurides, esters and half esters of sulfosuccinic acid with monohydric alcohols or alkylphenols containing 4 to about 15 carbon atoms, which can be optionally ethoxylated with 1 to about 40 EO units, alkali metal and ammonium salts of carboxylic acids, for example of fatty acids or resin acids containing about 8 to about 32 carbon atoms or their mixtures, partial esters of phosphoric acid and their alkali metal and ammonium salts. However, alkyl and alkaryl phosphates containing about 8 to about 22 carbon atoms in the organic group, alkyl ether- or alkaryl ether phosphates containing about 8 to about 22 carbon atoms in the alkyl or alkaryl group and 1 to about 40 EO units can be employed as the anionic emulsifiers. The alkali metal salts of the alkyl ether sulfates are preferred. Particularly preferred anionic emulsifiers are Disponile (Cognis) of the FES series such as for example 32 IS, 993 IS, 77 IS and 61 IS. The anionic emulsifiers can be employed individually or as mixtures of anionic emulsifiers or as mixtures with non-ionic emulsifiers.

Exemplary non-ionic emulsifiers are polyvinyl alcohol that still has for example, about 8 to about 20% of acetate units and a polymerization degree of about 200 to about 5000, alkyl polyglycol ethers, preferably those with about 8 to about 40 EO units and alkyl groups containing about 8 to about 20 carbon atoms, alkylaryl polyglycol ethers, preferably those with about 8 to about 40 EO units and about 8 to about 20 carbon atoms in the alkyl or aryl groups, ethylene oxide/propylene oxide (EO-PO) block copolymers, preferably those with about 8 to about 40 EO or PO units, addition products of alkylamines containing alkyl groups of about 8 to 22 carbon atoms with ethylene oxide or propylene oxide, fatty or resin acids containing about 6 to about 32 carbon atoms, alkyl polyglycosides containing linear or branched, saturated or unsaturated alkyl groups with on average about 8 to about 24 carbon atoms and an oligo glycoside group with about 1 to about 10 hexose- or pentose units in the agent or mixtures of two or more thereof, natural products and their derivatives such as lecithin, lanolin, sarcosine, cellulose, cellulose alkyl ethers and carboxyalkyl celluloses, the alkyl groups of which each possess 1 to about 4 carbon atoms, linear organo(poly)siloxanes that comprise polar groups, particularly those with alkoxy groups containing up to about 24 carbon atoms and up to about 40 EO- or PO groups. Alkoxylated, particularly ethoxylated fatty alcohols are the particularly preferred non-ionic emulsifiers. The non-ionic emulsifiers can be employed singly or as mixtures of non-ionic emulsifiers or as mixtures with anionic emulsifiers.

In a preferred embodiment of the present invention, the following emulsifiers are employed: the alkali metal salts, particularly the Na-salt of the $C_{12/14}$-fatty alcohol ether sulfates, alkylphenol ether sulfates, particularly their alkali metal or $NH_4$ salts, Na n-dodecyl sulfate, di-K oleic acid sulfonate ($C_{18}$), Na n-alkyl ($C_{10}$-$C_{13}$)-benzene sulfonate, Na 2-ethylhexyl sulfate, $NH_4$ lauryl sulfate ($C_{8/14}$), Na lauryl sulfate ($C_{12/14}$), Na lauryl sulfate ($C_{12/16}$), Na lauryl sulfate ($C_{12/18}$), Na cetylstearyl sulfate ($C_{16/18}$), Na oleylcetyl sulfate ($C_{16/18}$), nonylphenol ethoxylate, octylphenol ethoxylate, $C_{12/14}$ fatty alcohol ethoxylates, oleylcetyl ethoxylates, $C_{16/18}$-fatty alcohol ethoxylates, cetylstearyl ethoxylates, ethoxylated triglycerides, sorbitan monolaurate, sorbitan monooleate, sorbitan-20EO-monooleate, Sorbitan-20EO-monostearate, sulfosuccinic acid monoester di-Na salt, fatty alcohol sulfosuccinates di-Na salt, dialkylsulfosuccinate Na salt or di-Na sulfosuccinamate or mixtures of two or more thereof. Likewise, mixtures of anionic and non-ionic surfactants, mixed non-ionic surfactants, alkylaryl ether phosphates and their acid esters, dihydroxystearic acid $NH_4$ salt, iso-eicosanol, aryl polyglycol ethers, glycerine monostearate can be employed. Particularly preferred non-ionic emulsifiers are Disponile (Cognis) from the A series e.g. 3065 and 4065.

The use of non-ionic emulsifiers or a mixture of one anionic emulsifier or a plurality of anionic emulsifiers with one non-ionic emulsifier or a plurality of non-ionic emulsifiers is quite particularly preferred.

Among the non-ionic emulsifiers, a particularly preferred group can be represented by the general formula (III)

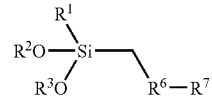

(III)

in which $R^1$ is a linear or branched alkyl group or alkoxy group containing 1 to 4 carbon atoms, $R^2$ and $R^3$ independently of one another are a linear or branched alkyl group containing 1 to 4 carbon atoms, $R^6$ is a divalent organic connecting group; and $R^7$ stands for a group that lends the compound of the general formula (III) the property of acting as an oil in water emulsifier in water.

$R^7$ preferably stands for a group, which derives from a compound that has an HLB value of 8 to 18, preferably 8 to 15. $R^7$ particularly preferably stands for a [propylene oxy]$_n$[ethylene oxy]$_m$-$R^5$ group, wherein n, m and $R^8$ are selected such that the HLB value of the corresponding amine $H_2$N-[propylene oxy]$_n$[ethylene oxy]$_m$-$R^8$ ranges from 8 to 15, and $R^8$ is an aliphatic group, a hydroxyl group or an amino group. A suitable amine of the formula $H_2$N-[propylene oxy][ethylene oxy]$_m$-$R^8$ for the production of the emulsifier of the general formula (III) is, for example Jeffamine® M2070 (Huntsman; n=10, m=31, $R^8$=methyl) with an HLB value of 13.

As these emulsifiers can be built into the curing network by partial or complete hydrolysis of the alkoxy groups during the curing reaction of the adhesive, sealant and coating agent, they can be designated as reactive emulsifiers. The use of reactive emulsifiers is preferred, particularly when using polyester- and polytetrahydrofuran-based polymers of formula (I), although other systems may be used.

The emulsifier content of the inventive emulsions is preferably less than 25 wt. %, more preferably less than 20 wt. %, particularly preferably less than 15 wt. %, based on the total weight of the emulsion.

In a preferred embodiment of the invention, the emulsifier fraction of the emulsion can be zero for the case where the added polymer of the general formula (I) concerns a polymer, in which the group $R^7$ stands for a group that lends the polymer of the general formula (I) the property of forming an oil in water emulsion in water.

$R^7$ in formula (I) preferably stands for a group, which derives from a compound that has an HLB value of 8 to 18, preferably 8 to 15. $R^7$ in formula (I) particularly preferably stands for a -[propylene oxy]$_n$[ethylene oxy]$_m$-$R^8$ group, wherein n, m and $R^8$ are selected such that the HLB value of the corresponding amine $H_2$N-[propylene oxy]$_n$[ethylene oxy]$_m$-$R^5$ has a value of 8 to 15, and $R^8$ is an aliphatic group, a hydroxyl group or an amino group. In general, emulsions that comprise a polymer with such a group $R^7$ exhibit self-emulsifying properties and mostly do not require additional anionic and/or non-ionic emulsifiers.

Consequently, the present invention also provides α-silyl terminated polymers of the general formula (I):

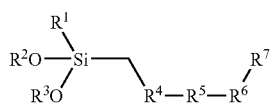

in which $R^1$ is a linear or branched alkyl group or alkoxy group containing 1 to 4 carbon atoms, $R^2$ and $R^3$ independently of one another are a linear or branched alkyl group containing 1 to 4 carbon atoms, $R^4$ and $R^6$ independently of one another are a divalent organic connecting group, $R^5$ is a hydrophobic divalent polymer backbone; and $R^7$ stands for a group that lends the polymer of the general formula (I) the property of self-emulsification in water by forming an oil in water emulsion.

$R^7$ in formula (I) preferably stands for a group, which derives from a compound that has an HLB value of 8 to 18, preferably 8 to 15. $R^7$ in formula (I) particularly preferably stands for a -[propylene oxy][ethylene oxy]$_m$-$R^5$ group, wherein n, m and $R^8$ are selected such that the HLB value of the corresponding amine $H_2N$-[propylene oxy]$_n$[ethylene oxy]$_m$-$R^8$ has a value of 8 to 15, and $R^8$ is an aliphatic group, a hydroxyl group or an amino group.

In a particularly preferred embodiment of the invention, an emulsion together with the polymer of the general formula (I) that is comprised therein is provided, wherein $R^1$ stands for methyl, ethyl, methoxy or ethoxy, and $R^2$ and $R^3$ independently of one another stand for methyl or ethyl, $R^4$ and $R^6$ independently of one another stand for a divalent connecting group comprising a urea and/or urethane group, $R^5$ is a divalent polytetrahydrofuran or polyester group and $R^7$ stands for a -[propylene oxy]$_n$[ethylene oxy]$_m$-$R^5$ group, wherein n, m and $R^8$ are selected such that the hydrophilic-lipophilic balance value of the corresponding amine $H_2N$-[propylene oxy]$_n$[ethylene oxy]$_m$-$R^8$ has a value of 8 to 15, and $R^8$ is an aliphatic group, a hydroxyl group or an amino group.

The inventive emulsion has a pH of 2 to 11. Preferably, in order not to damage the substrate, the pH is adjusted to 3 to 10, preferably 4 to 9 and more preferably from 4 to 6 in the weak acid region. In particular, for the production of storage stable, self-emulsifying polymers and/or systems comprising reactive emulsifiers, a pH of 4 to 7, even better 4 to 6 has proven to be advantageous. The pH can be stabilized, for example, by the use of conventional buffer substances and be adjusted with organic or inorganic acids and bases.

In addition to the obligatory compounds of the general formula (I) and the non-ionic and/or anionic emulsifiers, the inventive emulsions can comprise one component as an additive or a plurality of components as additives, which can also optionally contribute to the solids content of 40 to 95 wt. %, preferably 50 to 95 wt. %, particularly preferably 70 to 95 or 80 to 95 wt. %. These include, for example, fillers, pigments, protective colloids, pH adjustors such as for example organic and inorganic acids and bases, buffer substances, adhesion promoters such as for example low molecular weight silanes, tackifiers, catalysts, film builders, plasticizers, redox stabilizers, UV stabilizers or viscosity modifiers. As the compositions of the cited additives can be extremely different, usually those are selected that will not impair the stability of the inventive emulsions and which are as inert as possible in regard to the obligatory components of the emulsion.

Accordingly, the inventive emulsion can comprise up to 70 wt. %, for example about 30 wt. % fillers. Examples of suitable fillers are inorganic compounds that are inert to silanes such as titanium dioxide, chalk, lime powder, precipitated silica, pyrogenic silica, zeolites, bentonites, ground minerals, glass beads, powdered glass, glass fibers as well as further inorganic fillers known to the person skilled in the art, as well as organic fillers, particularly short fibers or hollow plastic beads. Optionally, fillers can be added that lend thixotropy to the preparation, for example swellable plastics like PVC.

In a particular embodiment, surface-modified fillers can also be employed.

Generally, all organic and inorganic pigments may be used as pigments, in so far as they do not destabilize the emulsion by interacting with the components of the emulsion. For example, finely divided silica (Aerosil brand silicas, such as R202, Aeroxide brand silicas, such as T05 or Sipernat brand silicas, such as S22) can be used.

Polyvinyl alcohols (such as Mowiol brand polyvinyl alcohols, e.g. 5-88 or 4-88), methyl cellulose and methyl cellulose derivatives (such as Culminal brand methyl cellulose and methyl cellulose derivatives) or polyvinyl pyrrolidones and copolymers thereof with vinyl acetate (such as Luviskol brand polymers, e.g. VA64) can be employed, for example as the protective colloids.

Fundamentally, all inorganic and organic acids and bases, which do not disadvantageously influence the inventive emulsion, are suitable pH adjustors. Sodium hydrogen carbonate or sodium hydroxide, for example, are suitable for adjusting to basic pH (pH>7), adjustment to acidic pH (pH<7) is carried out, for example, with hydrochloric acid. The inventive emulsion comprises the pH adjustor, where necessary, in an amount of up to about 10 wt. %, for example about 1 to about 5 wt. % or about 0.01 to about 1 wt. %, based on the total emulsion.

Moreover, typical buffer systems, such as for example phosphate buffer or citrate buffer systems can be employed.

Suitable exemplary adhesion promoters are low molecular weight silanes with a molecular weight of less than 200 and which possess one or more silane groups.

The inventive preparation can comprise up to about 50 wt. % of conventional tackifiers. Exemplary tackifiers are resins, terpene oligomers, cumarone-/indene resins, aliphatic, petrochemical resins and modified phenolic resins. In the context of the present invention, hydrocarbon resins, for example are suitable, such as those obtained by polymerizing terpenes, principally pinenes, dipentene or limonene. Generally, these monomers are cationically polymerized by initiation with Friedel-Crafts catalysts. Copolymers of terpenes and other monomers, for example styrene, isoprene and the like, are also counted among the terpene resins. The cited resins are used, for example, as tackifiers for pressure-sensitive adhesives and coating materials. The terpene-phenol resins, which are manufactured by acid catalyzed addition of phenols to terpenes or colophonium are also suitable. Terpene-phenol resins are soluble in most organic solvents and oils and are miscible with other resins, waxes and rubber. In the context of the present invention, the colophonium resins and their derivatives, for example their esters or alcohols, are likewise suitable in the above sense as additives. Further examples may be found in WO 93/23490.

In addition, the inventive preparation can comprise up to about 10 wt. % of catalysts for controlling the curing rate. Suitable exemplary catalysts are organometallic compounds such as iron or tin compounds, especially the 1,3-dicarbonyl compounds of iron or of 2- or 4-valent tin, in particular the Sn(II) carboxylates or the dialkylSn(IV) dicarboxylates or the corresponding dialkoxylates such as e.g. dibutyltin dilaurate, dibutyltin diacetate, dioctyltin diacetate, dibutyltin maleate, tin(II) octoate, tin(II) phenolate or the acetylacetonates of 2- or 4-valent tin.

Examples of suitable plasticizers are esters such as abietic acid esters, adipic acid esters, azelaic acid esters, benzoic acid esters, butyric acid esters, acetic acid esters, esters of higher fatty acids containing about 8 to about 44 carbon atoms, esters of fatty acids with OH groups or epoxidized fatty acids, fatty acid esters and fats, glycolic acid esters, phosphoric acid esters, phthalic acid esters, of linear or branched alcohols with 1 to 12 carbon atoms, propionic acid esters, sebacic acid esters, sulfonic acid esters, thiobutyric acid esters, trimellitic acid esters, citric acid esters as well as esters based on nitrocellulose and polyvinyl acetate, as well as mixtures of two or more thereof. The asymmetric esters of difunctional, aliphatic dicarboxylic acids are particularly suitable, for example the esterified product of the monooctyl ester of adipic acid monooctyl ester with 2-ethylhexanol (EDENOL DOA, Henkel, Duesseldorf). Pure or mixed ethers of monofunctional, linear or branched $C_{4-16}$ alcohols or mixtures of two or more different ethers of such alcohols, for example dioctyl ether (available as CETIOL OE, Henkel, Duesseldorf) are also suitable as plasticizers. Furthermore, polyethylene glycols or diurethanes with blocked end groups can also be used.

In addition, the inventive preparation can comprise up to about 10 wt. %, particularly up to about 1 wt. % redox stabilizers or antioxidants.

The inventive preparation can comprise up to about 5 wt. %, for example about 1 wt. % of UV stabilizers. The hindered amine light stabilizers (HALS) are particularly suited as UV stabilizers. In the scope of the present invention, the inventive preparation possibly comprises a UV stabilizer that has a silane group and becomes attached to the end product during crosslinking or curing. The products LOWILITE 75 and LOWILITE 77 (Great Lakes, USA) are particularly suitable for this.

The present invention also makes available a process for the manufacture of the inventive emulsions, wherein firstly a mixture of one polymer or a plurality of polymers of the general formula (I) is manufactured

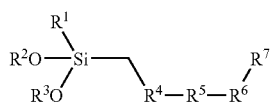

in which $R^1$ is a linear or branched alkyl group or alkoxy group containing 1 to 4 carbon atoms, $R^2$ and $R^3$ independently of one another are a linear or branched alkyl group containing 1 to 4 carbon atoms, $R^4$ and $R^6$ independently of one another are a divalent organic connecting group, $R^5$ is a hydrophobic divalent polymer backbone; and $R^7$ is a $CH_2SiR^1(OR^2)(OR^3)$, in which $R^1$, $R^2$ and $R^3$ have the above meaning or $R^7$ stands for a group that lends the polymer of the general formula (I) the property of self-emulsification in water by forming an oil in water emulsion; with one anioinic and/or non-ionic emulsifier or a plurality of anionic and/or non-ionic emulsifiers, which are capable of forming an oil in water emulsion; and wherein, for the case that $R^7$ stands for a group that lends the polymer of the general formula (I) the property of self-emulsification in water by forming an oil in water emulsion, at least a part of the emulsifier(s) is replaced by polymers of formula (I).

In a further step, the components of the aqueous emulsion are added to this mixture, wherein a pH is adjusted to 2 to 11, preferably 3 to 10, more preferably 4 to 9 and even more preferably 4 to 6 or 7 and a solids content is adjusted to 40 to 95 wt. %, based on the total weight of the emulsion. In this way there results a storage stable oil in water emulsion.

Additional non-aqueous components can be added during the mixing of the polymer(s) with the emulsifier or mixture of emulsifiers. It is critical that the aqueous components, such as water, buffer or aqueous pH adjustors are added only after the polymer(s) of formula (I) have been blended with the emulsifier(s).

In the present invention, "storage stability" is understood to mean the property of the inventive emulsions to be capable of storage at a temperature of 23° C. for at least one week, preferably at least two weeks without demixing and that after storage, adhesive bonds can be produced, which in comparison with an adhesive bond manufactured directly after production of the emulsion, exhibit a tensile shear strength corresponding to at least 20% of the tensile shear strength without storage. However, the inventive emulsions usually show considerably longer storage stabilities (no demixing after periods of 4 to 6 months) at significantly higher temperatures (40° C.). Usually, the value of the tensile shear strength of adhesive bonds that were manufactured with emulsions that had been stored for some weeks (for example 2 weeks) is more than 30%, mostly more than 50% of the value obtained without storing the emulsion.

In a further aspect, the invention makes available the use of the inventive emulsions for manufacturing adhesives, sealants, coating agents and polymeric compounds or their use as adhesives, sealants, coating agents and polymeric compounds. In particular, the use for the cited purposes of such emulsions that comprise the inventive self-emulsifying α-silyl terminated polymer and/or the inventive reactive emulsifier, is preferred.

The inventive emulsions are suitable for a wide field of applications in the domain of surface coatings, adhesives and sealants. The inventive emulsions are particularly suitable, for example, as contact adhesives, one component adhesives, two component adhesives, structural adhesives, spray adhesives, adhesive sticks, sealants, particularly joint sealing compounds, and for surface sealing.

Accordingly, the subject of the invention is also the use of the inventive emulsions as adhesives, sealants, surface coating agents, filling compounds or for manufacturing moldings.

For example, the inventive emulsions and the inventive self-emulsifying α-silyl terminated polymers are suitable as an adhesive for plastics, metals, mirrors, glass, ceramics, mineral foundations, wood, leather, textiles, paper, cardboard and rubber, wherein the materials can each be adhered to themselves or to any other material.

In the context of an embodiment of the invention, the inventive emulsions are formulated as a spray adhesive, for example. For this, the inventive preparation, together with a suitable propellant, is introduced into a suitable spray can.

In the context of a further embodiment of the present invention, the inventive emulsions are formulated as an adhesive stick. For this, suitable thickeners are added to the inventive emulsions. Suitable exemplary thickeners are CARBOPOL 672 (BF Goodrich), SOFTISAN Gel (Contensio), AEROSIL (Degussa), SIPERNAT (Degussa), RILANIT HT extra (Henkel), RILANIT spez. micro. (Henkel), CUTINA HR (Henkel), GENUVISCO carrageen TPH-1 (Hercules), KLUCEL MF (Hercules), MILLITHIX 925 (Milliken), RHEOLATE 204 (Rheox), DISORBENE LC (Roquette), DISORBENE M (Roquette), PERMUTEX RM 4409 (Stahl), STOCKOSORB (Stockhausen), FAVOR PAC 230 (Stockhausen), T 5066 (Stockhausen), WACKER HDK H2000 (Wacker) and WACKER HDK V 15 (Wacker).

In addition, the inventive emulsions and the inventive self-emulsifying α-silyl terminated polymers are suitable, for example, as an adhesive for plastics, metals, mirrors, glass, ceramics, mineral foundations, wood, leather, textiles, paper, cardboard and rubber, wherein the materials can each be adhered to themselves or to any other material.

For example, the inventive emulsions and the inventive self-emulsifying α-silyl terminated polymers can also be used as a surface coating agent for surfaces made of plastic, metal, mirrors, glass, ceramics, minerals, wood, leather, textiles, paper, cardboard and rubber.

The inventive emulsions and the inventive self-emulsifying α-silyl terminated polymers are also suitable for manufacturing moldings of any shape.

An additional field of application for the inventive emulsions and the inventive self-emulsifying α-silyl terminated polymers is the use as plugs, hole fillers or crack fillers.

An additional subject of the invention consists of an adhesive, a surface coating agent or a sealant, produced with an inventive emulsion.

EXAMPLES

Production of Polymer A 1530 g of ACCLAIM polyol 18200 N (polypropylene glycol with an OH number of 5.5) were freed from water at 60° C. and 0.6 mbar for 30 minutes. Then, nitrogen was admitted and under a nitrogen purge, 0.3 g TINSTAB BL 277 (=DBTL, dibutyltin dilaurate) and then 25.28 g GENIOSIL XL 42 (isocyanatomethyl dimethoxy (methyl)silane) were added. The mixture was then stirred at 80° C. until quantitative reaction. Under the exclusion of air, plastic cartridges were filled with the still hot Polymer A. The melt viscosity at 80° C. was 4.0 Pa s (cone/plate method, Brookfield CAP 2000 Viscometer, cone 6, 50 rpm, 25 sec.).

Production of Polymer B 650.40 g PE (LIOFOL Polyester 218) were freed from water at 60° C. and 1.2 mbar for 45 minutes. Then, nitrogen was admitted and under a nitrogen purge, 400 g LUPRANAT MCI (diphenylmethane-2,4'-diisocyanate were added. After 60 minutes the mixture was cooled down to 60° C. 345.50 g GENIOSIL XL 973 (N-phenylaminomethyl trimethoxy silane) were then added. The mixture was then stirred at 80° C. until quantitative reaction. Under the exclusion of air, plastic cartridges were filled with the still hot Polymer B. The melt viscosity at 80° C. was 4.6 Pa s (cone/plate method, Brookfield CAP 2000 Viscometer, cone 6, 50 rpm, 25 sec.).

Production of Polymer C 409.14 g PTHF 650 (polytetrahydrofuran with an OH number of 175, available from BASF) were freed from water at 80° C. and 3 mbar for 60 minutes under an argon purge. It was then allowed to cool down to 60° C. under argon. Under an argon purge, 319.07 g LUPRANAT MCI (diphenylmethane-2,4'-diisocyanate) were added. The mixture was heated to a temperature of 75° C. for 10 minutes. After the exothermic reaction had subsided, stirring was continued for 110 minutes at 75° C. 275.60 g GENIOSIL XL 973 (N-phenylaminomethyl trimethoxy silane) were then added at a temperature of 70° C. under argon. The mixture was then stirred at 80° C. until quantitative reaction. Polymer C was filled into cartridges. The melt viscosity at 80° C. was 3.4 Pa s (cone/plate method, Brookfield CAP 2000 Viscometer, cone 6, 50 rpm, 25 sec.).

Production of Polymer D 59.86 g PTHF 650 (polytetrahydrofuran with an OH number of 179, available from BASF) and 24.69 g PEG 600 (Clariant polyethylene glycol 600 PU with an OH number of 186) were freed from water at 80° C. and 3 mbar for 60 minutes under an argon purge. It was then allowed to cool down to 58° C. under argon. Under an argon purge, 68.21 g LUPRANAT MCI (diphenylmethane-2,4'-diisocyanate) were added. After the exothermic reaction had subsided, the mixture was heated for 80 minutes at a temperature of 80° C. 50.26 g WACKER SL 449025 (N-phenylaminomethyl dimethoxy(methyl)silane) and 4.85 g GENIOSIL XL 973 (N-phenylaminomethyl trimethoxy silane) were then added at a temperature of 60° C. under argon. The mixture was then stirred at 75° C. until quantitative reaction. Tubes were filled with Polymer D under argon.

Production of Polymer E 150 g PE (LIOFOL Polyester 218) and 50 g Jeffamine® M-2070 (methoxy poly(oxyethylene/oxypropylene)-2-propylamine) were freed from water at 60° C. and 0.8 mbar for 30 minutes. Then, nitrogen was admitted and under a nitrogen purge, 98.05 g LUPRANAT MCI (diphenylmethane-2,4'-diisocyanate) were added. After 60 minutes the mixture was cooled down to 60° C. 84.69 g GENIOSIL XL 973 (N-phenylaminomethyl trimethoxy silane) were then added. The mixture was then stirred for 1 hour at 80° C. until quantitative reaction. Coated aluminum tubes were filled with the still hot Polymer E. The melt viscosity at 80° C. was 2.7 Pa s (cone/plate method, Brookfield CAP 2000 Viscometer, cone 6, 50 rpm, 25 sec.).

Production of Polymer F 95.16 g PTHF 650 (polytetrahydrofuran with an OH number of 174, available from BASF) and 30 g Jeffamine® M-2070 (methoxy poly(oxyethylene/oxypropylene)-2-propylamine, available from Huntsman) were freed from water at 80° C. and 3 mbar for 60 minutes under an argon purge. It was then allowed to cool down to 78° C. under argon. Under an argon purge, 77.57 g LUPRANAT MCI (diphenylmethane-2,4'-diisocyanate) were added. After the exothermic reaction had subsided, the mixture was heated for 110 minutes at a temperature of 80° C. 66.97 g GENIOSIL XL 973 (N-phenylaminomethyl trimethoxy silane) were then added at a temperature of 70° C. under argon. Stirring was continued at a temperature of 80° C. until quantitative reaction (ca. 2 hours). Tubes were filled with Polymer F under argon. The melt viscosity at 80° C. was 1.6 Pa s (cone/plate method, Brookfield CAP 2000 Viscometer, cone 6, 50 rpm, 25 sec.).

Production of the (Reactive) Emulsifier I 199.81 g Jeffamine® M-2070 (methoxy poly(oxyethylene/oxypropylene)-2-propylamine, 10PO/31 EO, available from Huntsman,) and 16.26 g GENIOSIL XL 42 (isocyanatomethyl dimethoxy(methyl) silane) were weighed under an argon blanket at room temperature. The mixture was stirred at a temperature of 80° C. for 240 minutes. Tubes were filled with Product I under argon. The melt viscosity at 80° C. was 0.9 Pa s (cone/plate method, Brookfield CAP 2000 Viscometer, cone 6, 50 rpm, 25 sec.).

TABLE 1

Polymers of the General Formula (I):

$$R^2O-\underset{R^3O}{\underset{|}{\overset{R^1}{\overset{|}{Si}}}}-R^4-R^5-R^6\diagup^{R^7}$$

| Polymer | $R^1$ | $R^2/R^3$ | $R^4$ | $R^5$ | $R^6$ | $R^7$ |
|---|---|---|---|---|---|---|
| A | Me | MeO | NH—CO | PPG | OC—NH | $CH_2SiMe(OMe)_2$ |
| B | MeO | MeO | N(Ph)-CO—NH-oPh-$CH_2$-pPh-NH—CO | PE | OC—NH-pPh-$CH_2$-oPh-NH—CO—NH | $CH_2Si(OMe)_3$ |
| C | MeO | MeO | N(Ph)-CO—NH-oPh-$CH_2$-pPh-NH—CO | PTHF | OC—NH-pPh-$CH_2$-oPh-NH—CO—NH | $CH_2Si(OMe)_3$ |
| D | Me/MeO | MeO | N(Ph)-CO—NH-oPh-$CH_2$-pPh-NH—CO | PTHF/PEG | OC—NH-pPh-$CH_2$-oPh-NH—CO—NH | $CH_2SiMe(OMe)_2$ $CH_2Si(OMe)_3$ |
| E | MeO | MeO | N(Ph)-CO—NH-oPh-$CH_2$-pPh-NH—CO | PE | OC—NH-pPh-$CH_2$-oPh-NH—CO—NH | $[PO]_6[EO]_{29}$Me |
| F | MeO | MeO | N(Ph)-CO—NH-oPh-$CH_2$-pPh-NH—CO | PTHF | OC—NH-pPh-$CH_2$-oPh-NH—CO—NH | $[PO]_6[EO]_{29}$Me |

Me: methyl;
MeO: methoxy
Ph: Phenyl;
oPh: ortho-phenylene;
pPh: para-phenylene
PPG: polypropylene glycol group;
PE: polyester group;
PTHF: polytetrahydrofuran group;
PEG: polyethylene glycol
PO: propylene oxy group;
EO: ethylene oxy group General Production Example for the Inventive Emulsions 10 g of the inventive Polymer A, B, C or D were homogenized with the emulsifier(s) (see Table 2 for quantities) and possible additional non-aqueous additives (see Table 2 for quantities) by means of a Speedmixer (DAC 150 FVZ, from Hauschild) for 20 seconds at 2000 rpm. 1 g buffer, or when no buffer was used, water was added, and stirring was continued for a further 20 seconds. The remainder of the buffer and/or the remaining water was added portion-wise, whereupon stirring was continued each time for 20 seconds thus forming a homogeneous cream.

The optionally comprised additives can be added either at the beginning or also subsequently, each according to the type of additive. Accordingly, non-aqueous components can already be incorporated in the emulsifying polymer mixture, prior to the addition of aqueous components, whereas aqueous components are always blended into the initially prepared emulsifier-polymer system.

In the case of the self-emulsifying Polymers E and F, the procedure is as above but as required no addition of emulsifier is made.

TABLE 2

| Ex. | Polymer [g] A | B | C | D | E | F | Emulsifiers [g] G | H | I | Water [g] | Solids [wt. %] | pH (ex. 26, 27*, 28*) | Additives [g] or Formulation sequence |
|---|---|---|---|---|---|---|---|---|---|---|---|---|---|
| 1 | 10 | | | | | | 0.5 | 0.5 | | 4.8 | 70 | 5.8 | 0.02 HCl |
| 2 | 10 | | | | | | 0.5 | 0.5 | | 2.3 | 80 | 5.8 | 0.02 HCl; 0.8 K30 |
| 3 | 10 | | | | | | 0.5 | 0.5 | | 3.2 | 75 | 6.0 | 0.02 HCl; 0.8 K30 |
| 4 | 10 | | | | | | 0.5 | 0.5 | | 1.0 | 84 | 8.3 | 1.3 buffer A; 0.1 GF91; 0.02 DBTL |
| 5 | 10 | | | | | | 0.5 | 0.5 | | 1.8 | 82 | 5.9 | 1.3 buffer A; 3 KRONOS |
| 6 | 10 | | | | | | 0.5 | 0.5 | | 1.1 | 84 | 5.9 | 1.3 buffer C; 1 KRONOS |
| 7 | 10 | | | | | | 0.5 | 0.5 | | 1.8 | 82 | 5.9 | 1.3 buffer C; 3 KRONOS |
| 8 | 10 | | | | | | 0.5 | 0.5 | | 0.0 | 91 | 5.9 | 1.3 buffer A; 1 KRONOS |
| 9 | 10 | | | | | | 0.5 | 0.5 | | 0.9 | 84 | 6.0 | 1.3 buffer A |
| 10 | 10 | | | | | | 0.5 | 0.5 | | 5.1 | 67 | 4.0 | 0.02 HCl; 0.8 K30 |
| 11 | 10 | | | | | | 0.5 | 0.5 | | 5.6 | 65 | 4.0 | 0.01 HCl; 0.8 K30 |
| 12 | 10 | | | | | | 0.5 | 0.5 | | 2.6 | 74 | 9.9 | 0.8 K30; 2 DYNASYLAN |
| 13 | 10 | | | | | | 0.15 | 0.15 | | 1.3 | 80 | 9.0 | 1.3 buffer A; 0.1 GF91; 0.02 DBTL |
| 14 | 10 | | | | | | 0.15 | 0.15 | | 1.3 | 80 | 5.8 | 1.3 buffer A; |
| 15 | 10 | | | | | | 0.5 | 0.5 | | 2.6 | 79 | 4.7 | 0.8 K30 |
| 16 | 10 | | | | | | 0.5 | 0.5 | | 5.1 | 67 | 4.0 | 0.02 HCl; 0.8 K30 |
| 17 | 10 | | | | | | 0.5 | 0.5 | | 2.3 | 80 | 5.8 | 0.02 HCl; 0.8 K30 |
| 18 | 10 | | | | | | 0.5 | 0.5 | | 1.4 | 79 | 9.4 | 0.07 GF91; 1.5 ACUSOL |
| 19 | 10 | | | | | | 0.5 | 0.5 | | 0.0 | 83 | 6.5 | 2.5 MOWIOL |
| 20 | 10 | | | | | | 0.85 | 0.85 | | 1.3 | 82 | 5.8 | 1.3 buffer C |

TABLE 2-continued

| Ex. | Polymer [g] | | | | | | Emulsifiers [g] | | | Water [g] | Solids [wt. %] | pH | Additives [g] or Formulation sequence (ex. 26, 27*, 28*) |
|---|---|---|---|---|---|---|---|---|---|---|---|---|---|
| | A | B | C | D | E | F | G | H | I | | | | |
| 21 | 10 | | | | | | 0.15 | 0.15 | | 1.3 | 80 | 5.9 | 1.3 buffer C |
| 22 | 10 | | | | | | 0.05 | 0.05 | | 1.3 | 80 | 6.3 | 1.3 buffer C |
| 23* | 10 | | | | | | 0.0 | 0.0 | | 1.3 | 80 | nd | 1.3 buffer C |
| 24 | 10 | | | | | | 0.5 | 0.5 | | 5.0 | 80 | 6.5 | (polymer + emulsifier) + water |
| 25* | 10 | | | | | | 0.5 | 0.5 | | 5.0 | 80 | 7.5 | (water + emulsifier) + polymer |
| 26* | 10 | | | | | | 0.5 | 0.5 | | 5.0 | 80 | 7.5 | (polymer + water) + emulsifier |
| 27 | | 10 | | | | | | | 2.0 | 0.0 | 64 | nd | 0.7 HPU; 7 buffer A |
| 28 | | 10 | | | | | | | 1.0 | 5.2 | 67 | 6.1 | 0.6 HPU |
| 29 | | 10 | | | | | | | 1.0 | 5.6 | 65 | 3.7 | 0.6 HPU; HCl |
| 30 | | 10 | | | | | | | 1.0 | 0.0 | 73 | Nd | 0.6 HPU; 4.0 buffer A |
| 31 | | 10 | | | | | | | 0.5 | 4.4 | 69 | 7.4 | 0.6 HPU |
| 32 | | | 10 | | | | | | 1.0 | 0.0 | 56 | nd | 0.6 HPU; 9.1 buffer A |
| 33 | | | 10 | | | | | | 0.5 | 5.8 | 63 | 3.5 | 0.6 HPU; HCl |
| 34 | | | | 10 | | | | | 1.0 | 0.0 | 67 | nd | 0.6 HPU; 5.6 buffer A |
| 35 | 10 | | | | | | | | 1.0 | 0.0 | 67 | nd | 0.6 HPU; 5.6 buffer A |
| 36 | | | | | 10 | | | | | 7.0 | 58 | 9.5 | 0.6 HPU; NaOH |
| 37 | | | | | 10 | | | | | 7.0 | 58 | 7.0 | 0.6 HPU |
| 38 | | | | | 10 | | | | | 0.0 | 56 | 6.0 | 0.6 HPU; 8.5 buffer A |
| 39 | | | | | 10 | | | | | 7.0 | 58 | 4.0 | 0.6 HPU; HCl |
| 40 | | | | | 10 | | | | | 0.0 | 56 | 4.8 | 0.6 HPU; 8.5 buffer B |
| 41 | | | | | 10 | | | | | 0.0 | 61 | 5.5 | 6.8 buffer A; HCl |
| 42 | | | | | 10 | | | | | 0.0 | 65 | 4.7 | 5.9 buffer B |
| 43 | | | | | 10 | | | | | 10.6 | 48 | 6.3 | |
| 44 | | | | | | 10 | | | | 8.8 | 53 | 7.2 | |
| 45 | | | | | | 10 | | | | 10.0 | 50 | 7.0 | 0.5 HPU |
| 46 | | | | | | 10 | | | | 0.0 | 52 | 4.5 | 0.6 HPU; 10 buffer B |
| 47 | | | | | | 10 | | | | 0.0 | 58 | 5.8 | 8 buffer A |
| 48 | | | | | | 10 | | | | 0.0 | 58 | 4.8 | 8 buffer B |

Abbreviations in Table 2:
Polymers A, B, C, D, E and F: see Table 1
G: Fatty alcohol containing 30 ethylene oxide units (DISPONIL A3065, Cognis);
H: Sodium lauryl ether sulfate (DISPONIL FES77, Cognis);
I: Adduct of methoxy(polyoxyethylene/polyoxypropylene-2-propylamine (Jeffamine ® M2070, Huntsman) with isocyanatom-ethyl-dimethoxy-methyl-silane (GENIOSIL XL42, Wacker);
Buffer A: potassium dihydrogen phosphate/disodium hydrogen phosphate (92:8, 5 wt. % in water);
Buffer B: disodium hydrogen phosphate (5 wt. % in water)/citric acid (10 wt. % in water) 2.2:1;
Buffer C: potassium dihydrogen phosphate/disodium hydrogen phosphate (1: 1.5 wt. % in water);
NaOH: sodium hydroxide (8 wt. %);
HCl: hydrochloric acid (10 wt. %);
KRONOS: Titanium dioxide (KRONOS 1001, Kronos);
K30: polyvinyl pyrrolidone (K30, Fluka, 40 wt. %);
ACUSOL: polyacrylate (ACUSOL 801 S, Rohm & Haas, 2 wt. %);
MOWIOL: polyvinyl alcohol (MOWIOL 4-98, Kuraray, 10 wt. %);
GF91: N-Aminoethylaminopropyl trimethoxy silane (GF91, Wacker);
HPU: polyurethane-polymer (HPU DSX 1514, Cognis, 40 wt. %);
DBTL: dibutyltin dilaurate (TINSTAB BL277, Akzo);
DYNASYLAN: siloxane oligomer (DYNASYLAN HS 2627, Degussa);
nd: not determined
*comparative Example:

Evaluation of the Emulsions of Examples 1 to 48

Storage Stability

The samples were stored in glass containers equipped with airtight screw caps in a climatic exposure test cabinet for various periods at 23° C. or 40° C.

After storage the samples were visually inspected in regard to the stability of the emulsion. The emulsion was considered to be storage stable in the absence of visible phase separation and of any significant changes in the flowability.

The storage times in weeks or months, during which no separation of the emulsion occurred, are shown in Table 3. The cited times are minimum times. As some emulsions were first subjected to storage tests shortly before filing of the present application, a storage time of, for example, "1 week" only reveals that the emulsion was stable after 1 week of storage. Should a disaggregation have occurred after a specific time, then this is shown in Table 3.

In addition, the tensile shear strength of an adhesive bond produced by the emulsion directly after production of the emulsion and following 1 or 2 weeks storage at 25° C. was determined as is described below.

Tensile Shear Strength

The tensile shear strength for determining the ultimate tensile strength of adhesive bonds was carried out pursuant to DIN 53283 and DIN 53281.

For this two test specimens (25×100 mm) of solid beech were prepared. The surface to be joined (25×100 mm) is coated on one side with the test emulsion and fixed with two clothes pegs. The samples were stored for 7 days at room temperature (25° C.). They were then torn apart by means of a Tensile Test machine from Zwick, model: Universal test machine (type number 144501, load force 10 kN), beech test specimens with an overlap of 20 mm in length and 25 mm width, speed 15 mm/min. The resulting tensile shear strength is measured in N/mm².

The ratio of the tensile shear strength of the adhesive bonds, produced after storage of the emulsion, to the tensile shear strength of the adhesive bonds, produced immediately after production of the emulsion, are given as "% of the initial value" in Table 4. A value of 80% means that 80% of the tensile shear strength of the directly used emulsion is achieved by using a stored emulsion.

TABLE 3

Storage stabilities/Minimum storage times

| | Example nr. of the emulsion |
|---|---|
| Minimum storage time at 23° C. | |
| >4 months | 1-5, 9, 17, 20, 45 |
| >4 months | 6-8, 18, 24, 27, 30, 34-38 |
| >4 months | 10-12, 16, 21, 22, 31, 33, 39, 40 |
| >4 months | 13-15, 19, 28, 41, 42, 43, 48 |
| >4 months | 46 |
| Breakdown after 2 weeks | 25*, 26* (formulation sequence) |
| Breakdown after 1 day | 23* (no addition of emulsifier) |
| 3 months | 32, 43, 47 |
| 2 months | 29 |
| 1 month | 44 |
| Minimum storage time at 40° C. | |
| >4 months | 2, 3 |
| >4 months | 1, 4, 5 |
| >4 months | 27, 45 |
| >4 months | 37-39 |
| >4 months | 30, 34, 35 |
| >4 months | 40-42, 48 |
| 1 month | 32 |
| 5 months | 33 |

TABLE 4

Ratios of tensile shear strengths in percent in comparison with adhesive bonds from non-stored emulsions

| Emulsion from | Tensile shear strength of adhesive bond of stored emulsions | |
|---|---|---|
| example nr. | 1 week storage | 2 weeks storage |
| 27 | 55.6 | 66.7 |
| 28 | nd | 27.3 |
| 29 | nd | 75.8 |
| 30 | 58.1 | nd |
| 31 | nd | 45.0 |
| 32 | 72.5 | nd |
| 33 | nd | 107.5 |
| 34 | 19.1 | nd |
| 36 | 65.4 | 63.5 |
| 37 | 57.7 | 55.8 |
| 38 | 51.1 | nd |
| 39 | 85.7 | 76.8 |
| 40 | nd | 68.9 |
| 41 | 73.5 | 63.3 |
| 42 | 62.1 | 60.6 |
| 43 | nd | 70.3 |
| 44 | nd | 56.6 |
| 45 | 25.0 | 25.0 |
| 46 | 88.1 | nd |
| 47 | 96.7 | 87.0 |
| 48 | 87.5 | 80.0 | nd: not determined

What is claimed is:

1. An aqueous storage stable emulsion of one or more polymers of the general formula (I):

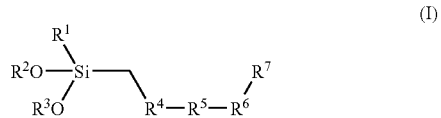

in which
R$^1$ is a linear or branched alkyl group or alkoxy group containing 1 to 4 carbon atoms;
R$^2$ and R$^3$ independently of one another are a linear or branched alkyl group containing 1 to 4 carbon atoms;
R$^4$ and R$^6$ independently of one another are divalent organic connecting groups;
R$^5$ is a hydrophobic divalent polymer group; and
R$^7$ is a -[propylene oxy]$_n$[ethylene oxy]$_m$-R$^8$ group, wherein n, m and R$^8$ are selected such that the hydrophilic-lipophilic balance value of the corresponding amine H$_2$N -[propylene oxy]$_n$[ethylene oxy]$_m$-R$^8$ ranges from 8 to 15, and R$^8$ is an aliphatic group, a hydroxyl group or an amino group;
wherein the emulsion has a pH of 2 to 11 and a solids content of 40 to 95 wt. % based on the total weight of the emulsion, and the emulsion comprises one or more anionic and/or non-ionic emulsifiers, which are capable of forming an oil in water emulsion; and wherein at least a part of the emulsifier(s) are replaced by polymers of formula (I).

2. An emulsion according to claim 1, wherein the anionic and/or non-ionic emulsifier(s), or their mixtures have an HLB value of 8 to 18.

3. An emulsion according to claim 1, wherein R$^1$ stands for methyl, ethyl, methoxy or ethoxy and R$^2$ and R$^3$, independently of one another, stand for methyl or ethyl.

4. An emulsion according to claim 1, wherein R$^4$ and R$^6$, independently of one another, stand for a divalent connecting group comprising urea- and/or urethane groups.

5. An emulsion according to claim 1, wherein R$^4$ and R$^6$ stand for a group —NR$^9$—(CO)—R$^{10}$—, wherein R$^{10}$ is linked to R$^5$, and R$^9$ stands for hydrogen, a linear or branched alkyl group containing 1 to 6 carbon atoms, a cycloalkyl group containing 4 to 6 carbon atoms or an aryl group containing 5 to 10 carbon atoms; and
R$^{10}$ stands for a single bond or a group —NR$^{11}$—R$^{12}$—, wherein the group R$^{12}$ is linked to R$^5$, and
R$^{11}$ stands for hydrogen, a linear or branched alkyl group containing 1 to 6 carbon atoms, a cycloalkyl group containing 4 to 6 carbon atoms or an aryl group containing 5 to 10 carbon atoms; and
R$^{12}$ stands for a group —R$^{13}$—(NH)$_r$—(CO)— with r=0 or 1, in which R$^{13}$ stands for an alkylaryl group containing 6 to 11 carbon atoms, an aralkyl group containing 6 to 11 carbon atoms, or an aryl group containing 5 to 10 carbon atoms, wherein the CO group is bonded to R$^5$.

6. An emulsion according to claim 1, wherein R$^5$ stands for a divalent group of a polypropylene glycol, polytetrahydrofuran, polyester, polyacrylate, polymethacrylate, polycyanoacrylate, polystyrene, polyimide, polyvinyl acetate, polycaprolactam, polycaprolactone, polybutadiene, polyethylene, polyvinyl chloride, polyacrylamide, polyacrylonitrile, polyethylene terephthalate, polycarbonate, polysulfide, polyether ketone, epoxy resin, phenol formaldehyde resin, polyurethane, polysiloxane or a copolymer of monomers of the cited polymers.

7. An emulsion according to claim 1, wherein the emulsifier(s) are selected from the group consisting of anionic and non-ionic emulsifiers and compounds of formula (III)

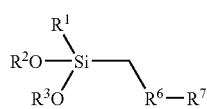

wherein
$R^1$ is a linear or branched alkyl group or alkoxy group containing 1 to 4 carbon atoms,
$R^2$ and $R^3$ independently of one another are a linear or branched alkyl group containing 1 to 4 carbon atoms, and
$R^6$ is a divalent organic connecting group.

8. An emulsion according to claim 1, wherein the emulsifier content is less than 25 wt. %, based on the total weight of the emulsion.

9. An emulsion according to claim 1, wherein the pH of the emulsion is 3 to 10.

10. An emulsion according to claim 1, comprising a mixture of an anionic and a non-ionic emulsifier.

11. An emulsion according to claim 1, wherein the hydrophobic divalent polymer group $R^5$ is a polyester group or a polytetrahydrofuran group.

12. An emulsion according to claim 1, additionally comprising one or more components selected from fillers, pigments, protective colloids, pH adjustors, buffer substances, adhesion promoters, tackifiers, catalysts, film builders, plasticizers, redox stabilizers, UV stabilizers or viscosity modifiers.

13. A method of adhering a material using an adhesive, said method comprising using an emulsion according to claim 1 as said adhesive or as a component of said adhesive.

14. A method of sealing a material using a sealant, said method comprising using an emulsion according to claim 1 as said sealant or as a component of said sealant.

15. A method of coating a surface using a surface coating agent, said method comprising using an emulsion according to claim 1 as said surface coating agent or as a component of said surface coating agent.

16. An aqueous storage stable emulsion of one or more polymers of the general formula (I):

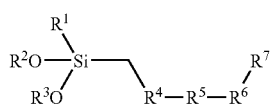

in which
$R^1$ is methyl, ethyl, methoxy or ethoxy;
$R^2$ and $R^3$ independently of one another are;
$R^4$ and $R^6$ independently of one another are a divalent connecting group comprising urea- and/or urethane groups;
$R^5$ is a divalent polytetrahydrofuran- or polyester group; and
$R^7$ is -[propylene oxy]$_n$[ethylene oxy]$_m$-$R^8$, wherein n, m and $R^8$ are selected such that the hydrophilic-lipophilic balance value of the corresponding amine $H_2N$-[propylene oxy]$_n$[ethylene oxy]$_m$-$R^8$ ranges from 8 to 15, and $R^8$ is an aliphatic group, a hydroxyl group or an amino group;
wherein the emulsion has a pH of 2 to 11 and a solids content of 40 to 95 wt. % based on the total weight of the emulsion, and the emulsion comprises one or more anionic and/or non-ionic emulsifiers, which are capable of forming an oil in water emulsion; and wherein at least a part of the emulsifier(s) are replaced by polymers of formula (I).

17. An emulsion according to claim 16, wherein $R^4$ and $R^6$ independently of one another stand for a group of formula (II):

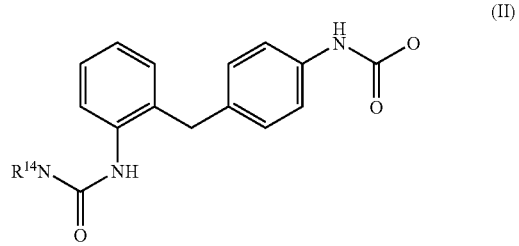

wherein the bond to $R^5$ occurs through the urethane group and $R^{14}$ stands for hydrogen, a linear or branched alkyl group containing 1 to 6 carbon atoms, a cycloalkyl group containing 4 to 6 carbon atoms or an aryl group containing 5 to 10 carbon atoms.

18. An α-silyl terminated polymer of the general formula (I):

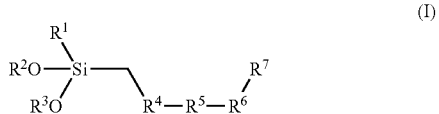

in which
$R^1$ is a linear or branched alkyl group or alkoxy group containing 1 to 4 carbon atoms,
$R^2$ and $R^3$ independently of one another are a linear or branched alkyl group containing 1 to 4 carbon atoms,
$R^4$ and $R^6$ independently of one another are divalent organic connecting groups,
$R^5$ is a hydrophobic divalent polymer backbone; and
$R^7$ stands for a group that lends the polymer of the general formula (I) the property of self-emulsification in water by forming an oil in water emulsion.

19. An α-silyl terminated polymer according to claim 18, wherein $R^7$ stands for a group that derives from a compound that has an HLB value of 8 to 18.

20. An α-silyl terminated polymer according to claim 18, wherein $R^7$ stands for a group -[propylene oxy]$_n$[ethylene oxy]$_m$-$R^8$, wherein n, m and $R^8$ are selected such that the HLB value of the corresponding amine $H_2N$-[propylene oxy]$_n$[ethylene oxy]$_m$-$R^8$ ranges from 8 to 15, and $R^8$ is an aliphatic group, a hydroxyl group or an amino group.

21. An α-silyl terminated polyoxyalkylene derivative of the general formula (III):

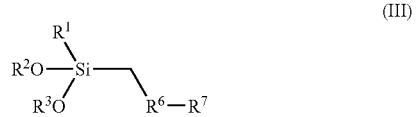

in which
- $R^1$ is a linear or branched alkyl group or alkoxy group containing 1 to 4 carbon atoms,
- $R^2$ and $R^3$ independently of one another are a linear or branched alkyl group containing 1 to 4 carbon atoms,
- $R^6$ is a divalent organic connecting group; and
- $R^7$ stands for a group that derives from a -[propylene oxy]$_n$[ethylene oxy]$_m$-$R^8$ group, wherein n, m and $R^8$ are selected such that the HLB value of the corresponding amine $H_2N$-[propylene oxy]$_n$[ethylene oxy]$_m$-$R^8$ ranges from 8 to 15, and $R^8$ is an aliphatic group, a hydroxyl group or an amino group.

\* \* \* \* \*